(12) United States Patent
Moran et al.

(10) Patent No.: US 8,714,038 B2
(45) Date of Patent: May 6, 2014

(54) INSTRUMENTS INCLUDING TOOLS

(75) Inventors: Stuart S Moran, Leeds (GB); Peter Moran, Leeds (GB); Michael J White, Leeds (GB)

(73) Assignee: Rolls Royce plc, London (GB)

( * ) Notice: Subject to any disclaimer, the term of this patent is extended or adjusted under 35 U.S.C. 154(b) by 1303 days.

(21) Appl. No.: 11/919,543

(22) PCT Filed: Apr. 28, 2006

(86) PCT No.: PCT/GB2006/001545
§ 371 (c)(1),
(2), (4) Date: Nov. 16, 2007

(87) PCT Pub. No.: WO2006/117519
PCT Pub. Date: Nov. 9, 2006

(65) Prior Publication Data
US 2008/0199304 A1  Aug. 21, 2008

(30) Foreign Application Priority Data
May 3, 2005  (GB) .................................... 0508824.0

(51) Int. Cl.
*F16H 25/08*  (2006.01)
(52) U.S. Cl.
USPC ........................................................ 74/55
(58) Field of Classification Search
USPC ......... 74/55, 56; 415/18; 73/861.79; 600/146
See application file for complete search history.

(56) References Cited

U.S. PATENT DOCUMENTS

| 4,640,124 A | 2/1987 | Diener et al. |
| 4,659,195 A | 4/1987 | D'Amelio et al. |
| 4,784,463 A | 11/1988 | Miyazaki |
| 4,901,821 A * | 2/1990 | Robbins ...................... 185/40 R |
| 5,251,611 A * | 10/1993 | Zehel et al. .................... 600/141 |
| 5,849,011 A * | 12/1998 | Jones et al. ..................... 606/47 |
| 6,006,002 A | 12/1999 | Motoki et al. |
| 6,221,087 B1 * | 4/2001 | Anderson et al. ............. 606/159 |
| 7,591,784 B2 * | 9/2009 | Butler ........................... 600/146 |
| 2002/0161281 A1 * | 10/2002 | Jaffe et al. ..................... 600/114 |
| 2002/0193662 A1 | 12/2002 | Belson |
| 2004/0193016 A1 | 9/2004 | Root et al. |
| 2006/0178562 A1 * | 8/2006 | Saadat et al. .................. 600/142 |

FOREIGN PATENT DOCUMENTS

| EP | 1 216 796 A | 6/2002 |
| GB | 2 141 837 A | 1/1985 |
| JP | A-03-103811 | 4/1991 |
| JP | A-10-177141 | 6/1998 |
| WO | WO 01/71500 A1 | 9/2001 |

* cited by examiner

*Primary Examiner* — Vicky Johnson
(74) *Attorney, Agent, or Firm* — Oliff PLC

(57) ABSTRACT

A tool has a flange attached to an engine housing. A primary cam is rotated to advance segments into the housing and a second rotational cam causes the segments to turn relative to each other as they are being inserted into the housing. This causes the segments to follow a predetermined path as they extend into the housing to bring a sensor at the end of the segments into a sensing position.

51 Claims, 14 Drawing Sheets

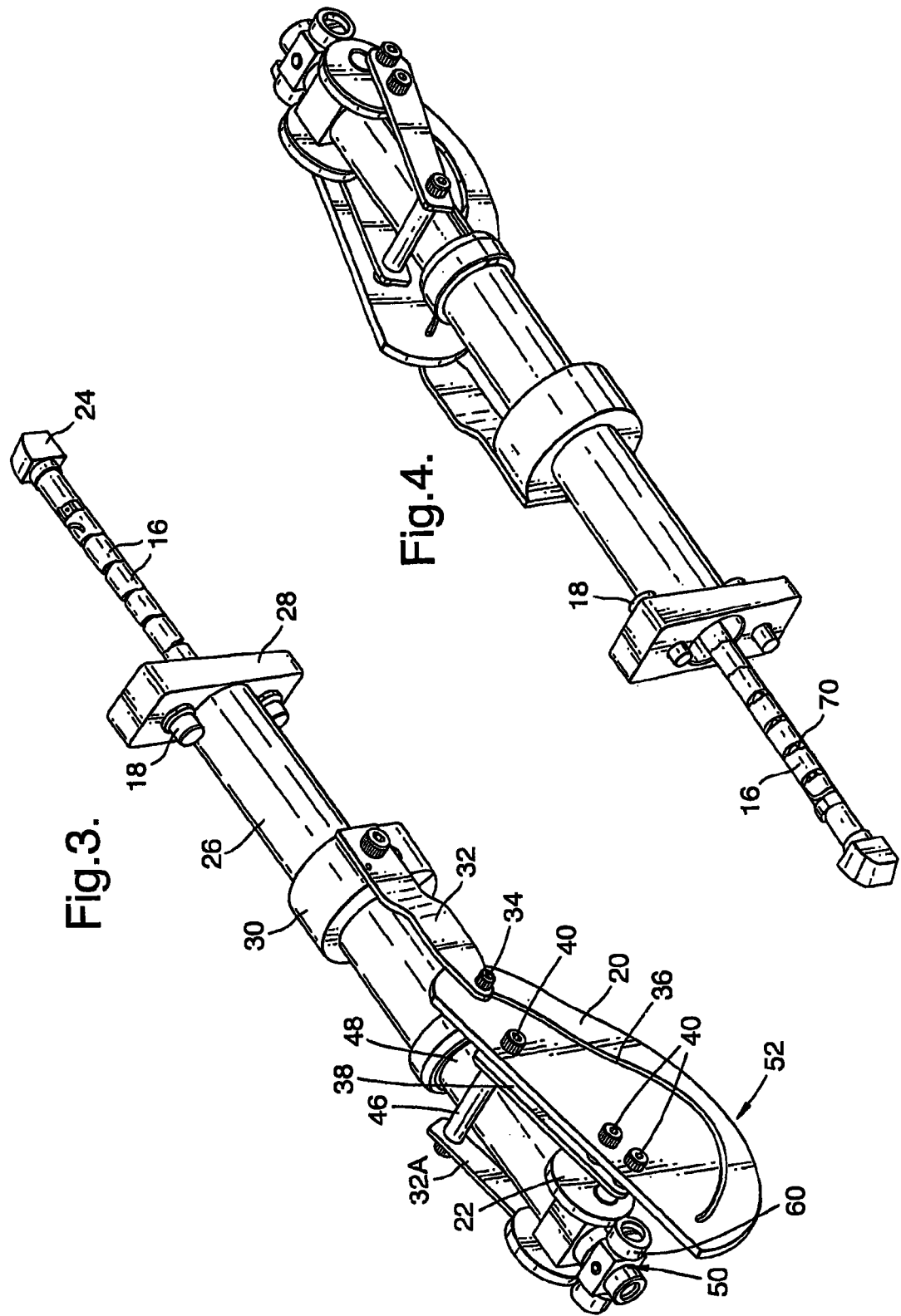

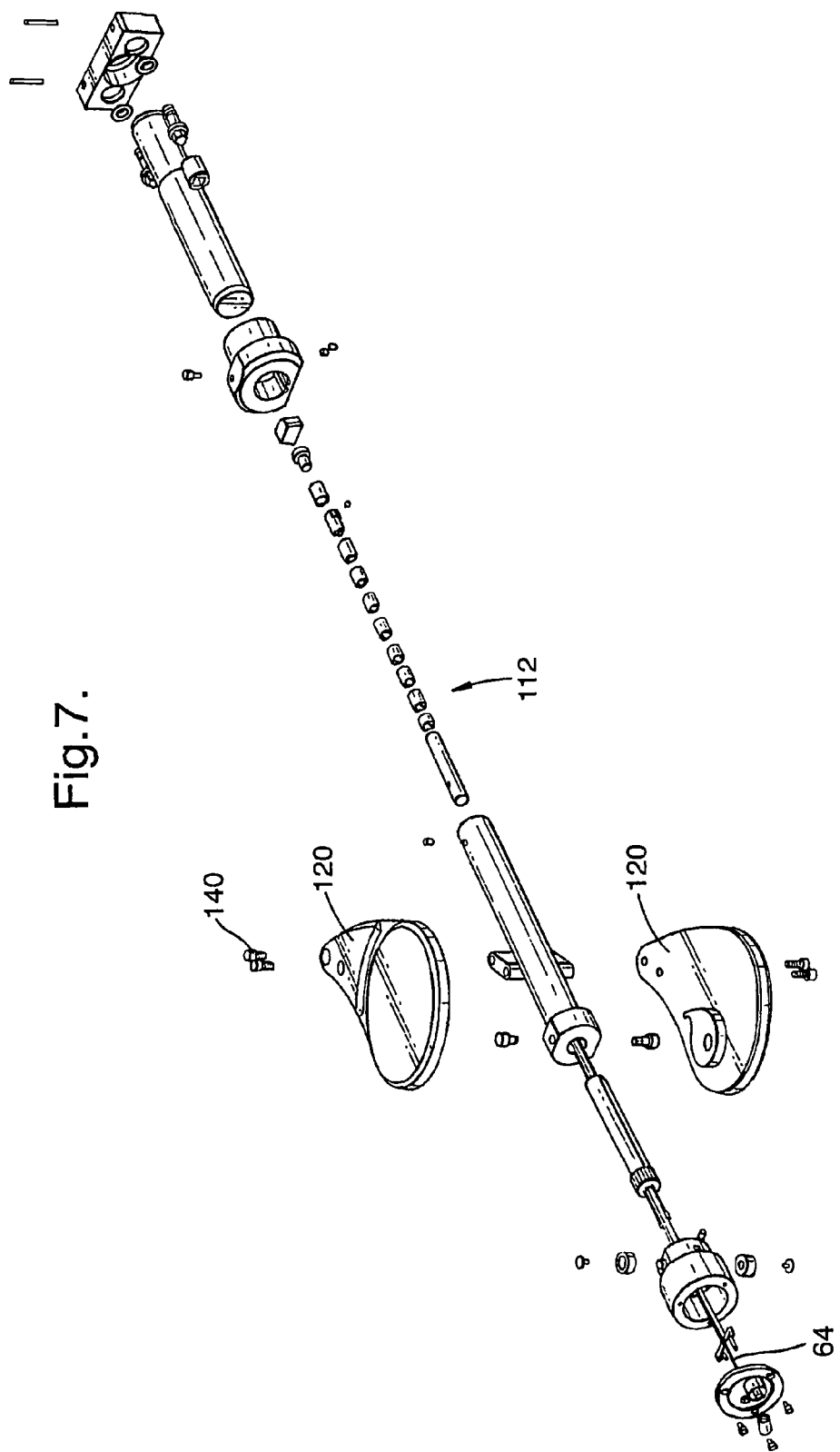

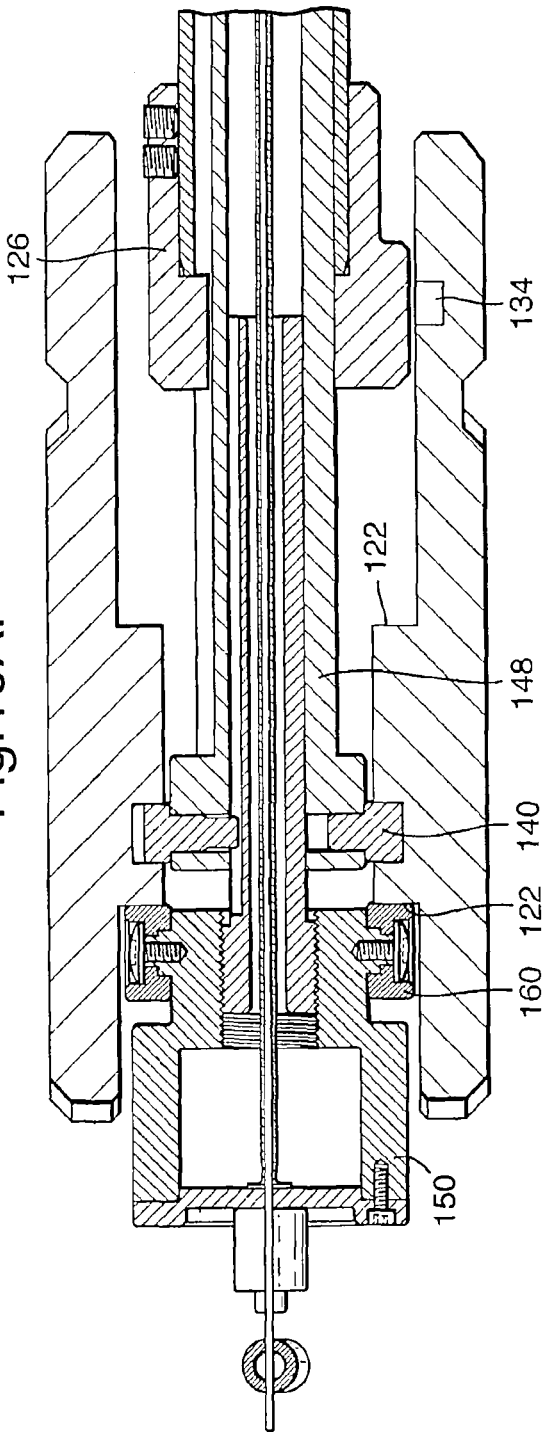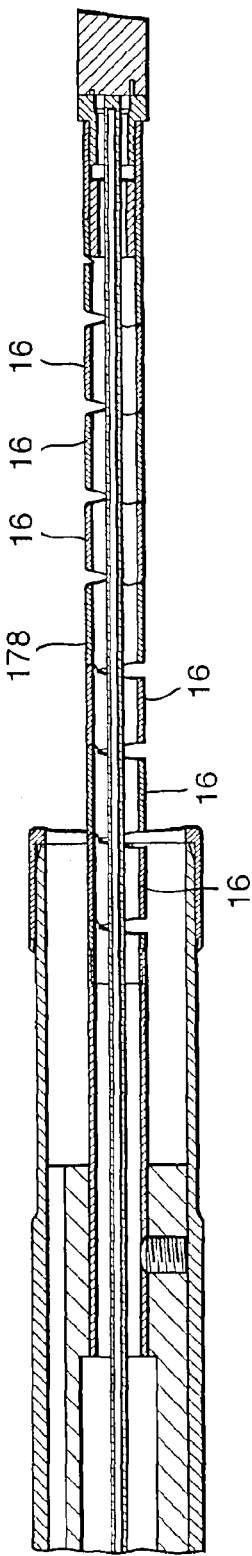

Fig. 18.
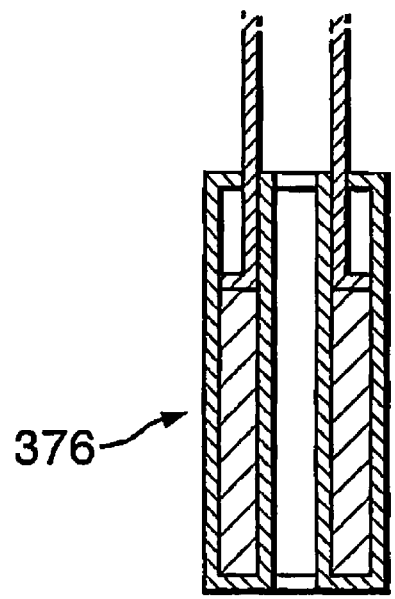
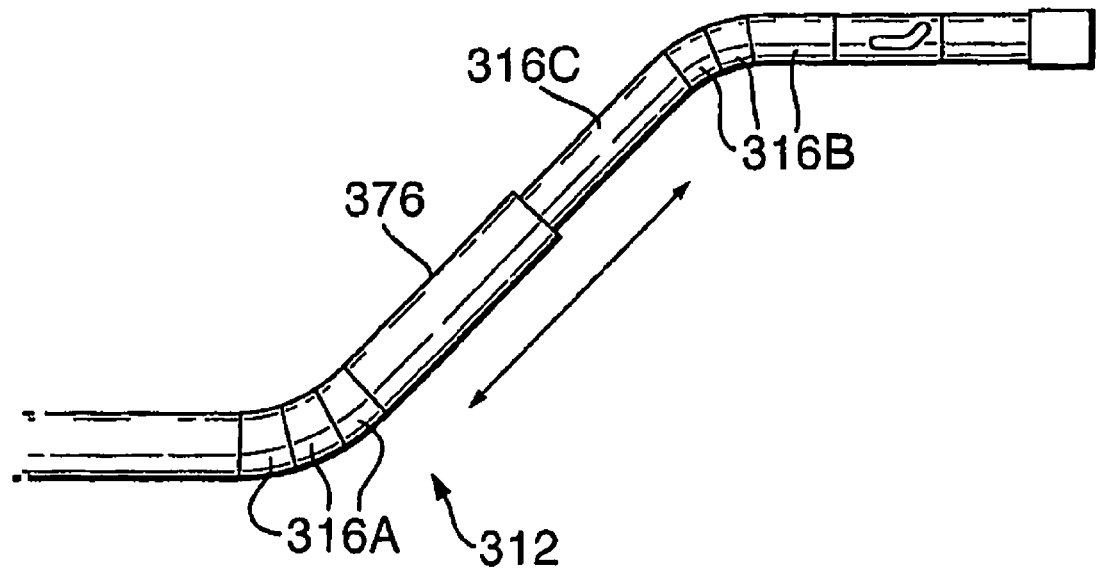

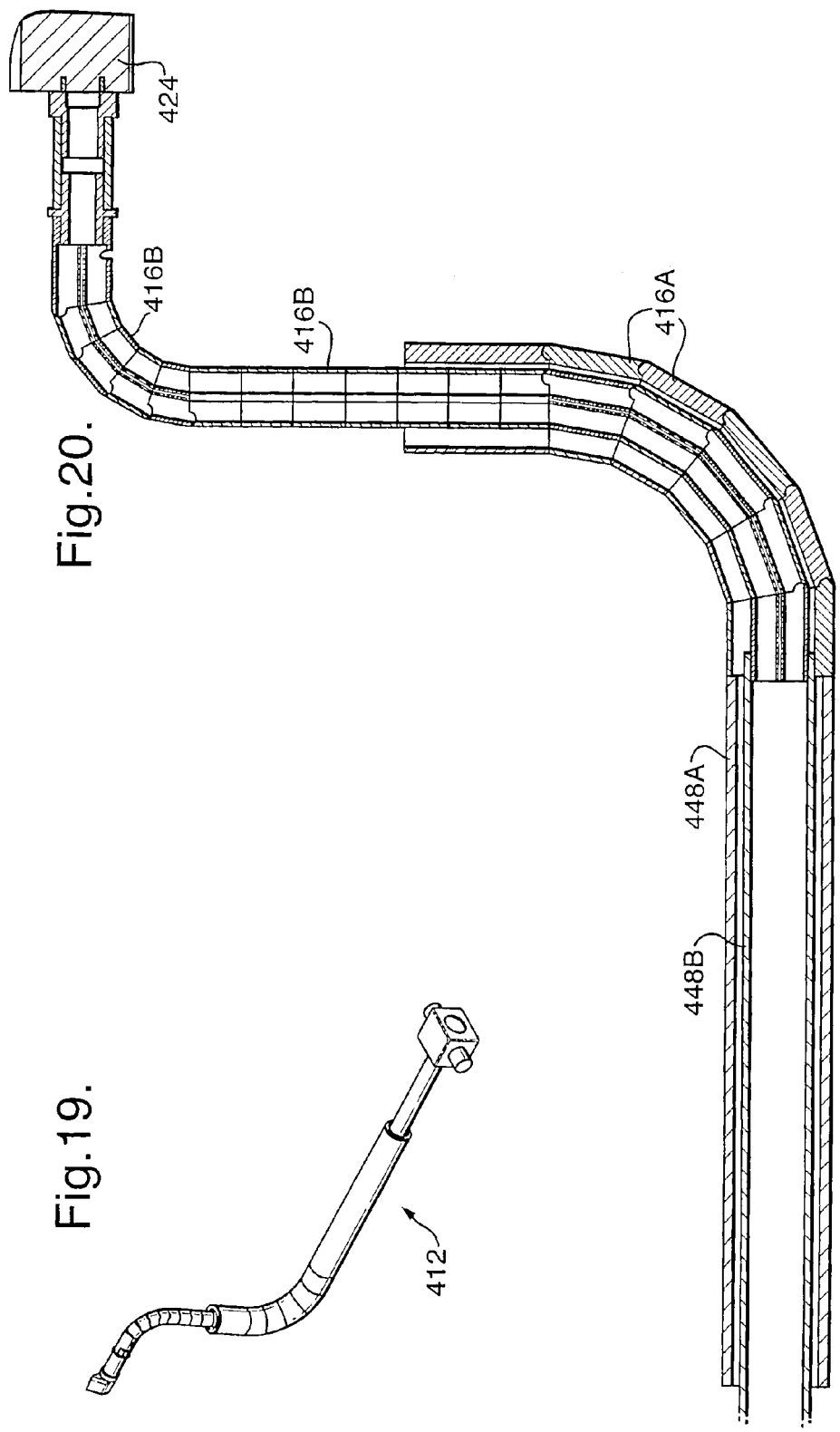

INSTRUMENTS INCLUDING TOOLS

The present invention relates to instruments including tools and to a method of using such an instrument. The instrument is particularly although not exclusively relevant to the inspection of the internal parts of machines such as the turbine blades of jet engines.

At regular periods it is necessary to inspect the blades of a turbine engine for signs of fatigue. Physical contact with the blades is undesirable but necessary as the blades have to be individually removed from the channel that they are located in, inspected and then replaced. This is a very time consuming job including 60 to 100 blades, for example, having to be removed and inspected. As the machine such as an aircraft is out of commission during inspection the cost is not only in the hours lost during inspection but also in the down time of the aircraft.

It is an object of the present invention to attempt to overcome at least one of the above or other problems.

According to one aspect of the present invention an instrument includes an elongate portion having a proximal and a distal region, the distal region including a tool, the elongate portion being movable from a first configuration to a second configuration whereby the shape of the elongate portion is altered, and the distal region of the elongate portion being arranged, in use, to be advanced.

It will be appreciated that the term "tool" used in this specification includes any item that is of use including a camera, fibre optic, optical device, an infra red or ultrasound inspection tool, a mechanical tool such as a cutter or driving tool and a welding tool and so on.

The present invention also includes a machine having an instrument as herein referred to mounted thereon.

According to another aspect of the present invention a method of using an instrument having an elongate portion with a tool at the distal region of the elongate portion comprises altering the shape of the elongate portion and advancing the distal region of the elongate portion.

The method may comprise inspecting the turbine blade of a jet engine by inserting the elongate portion through a housing of the engine and advancing the distal region of the elongate portion and changing the shape of the elongate portion to bring an inspection tool into the region of the blade that is to be inspected, carrying out the inspection and then retracting the elongate portion through the housing.

The method may comprise advancing the distal region and changing the shape such that the blades of the turbine are not contacted during advancement or retraction of the elongate portion.

The method may comprise attaching the instrument to the housing. The method may comprise inspecting a plurality of blades of the turbine such as by indexing the turbine to bring the blades into the region of the housing where the instrument is attached to the housing.

The method may comprise monitoring the blade being inspected such that a blade requiring replacement or repair can subsequently be located.

In this specification reference is made to the advancement of the distal region and to the changing of shape. It will be appreciated that any of the sequences of operation, or any of the features relating to advancement and change of shape can apply when retracting the elongate portion with the shape of the elongate portion changing back.

Further features of the present invention are referred to in the appended claims.

The present invention includes any combination of the herein referred to features or limitations.

The present invention can be carried into practice in various ways but several embodiments will now be described by way of example and with reference to the accompanying drawings, in which:—

FIGS. 3 and 4 are perspective views from one end and the other end respectively of the tool 12;

FIG. 7 is an exploded view of a second inspection tool 112;

FIG. 10 is a detail of the part X of FIG. 9;

FIG. 18 is a side view of the end of a fourth embodiment of a tool 312;

FIG. 19 is a perspective view of a fifth embodiment of a tool 412 and FIG. 20 is a section through the tool 412;

Figure 21:
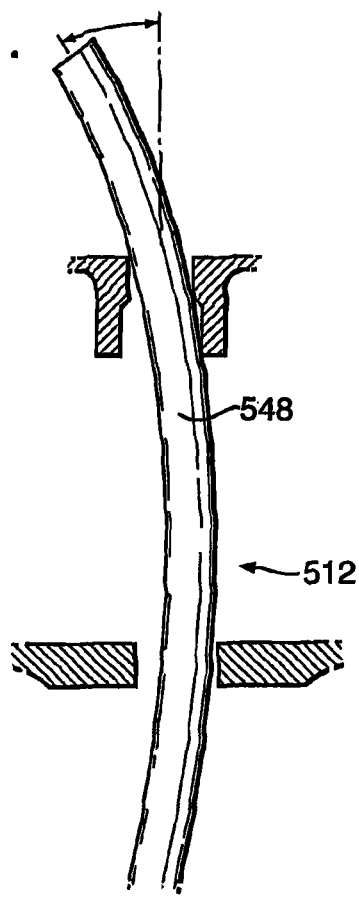
Figure 22:
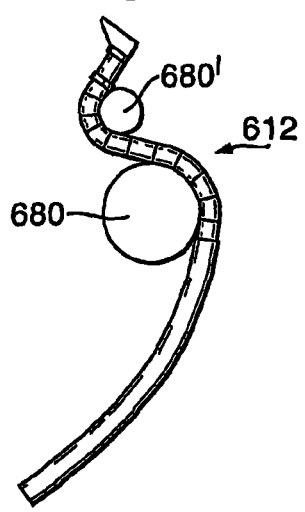
Figure 23:
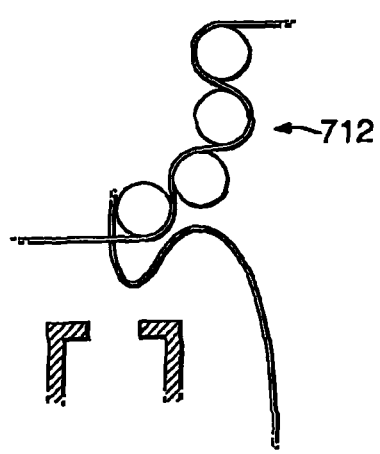

FIG. 21 is a schematic view showing an entry angle for a sixth embodiment of a tool 512; and FIGS. 22 and 23 are schematic views showing different paths that may be taken by seventh and eight embodiments of tools 612 and 712.

Figure 1:
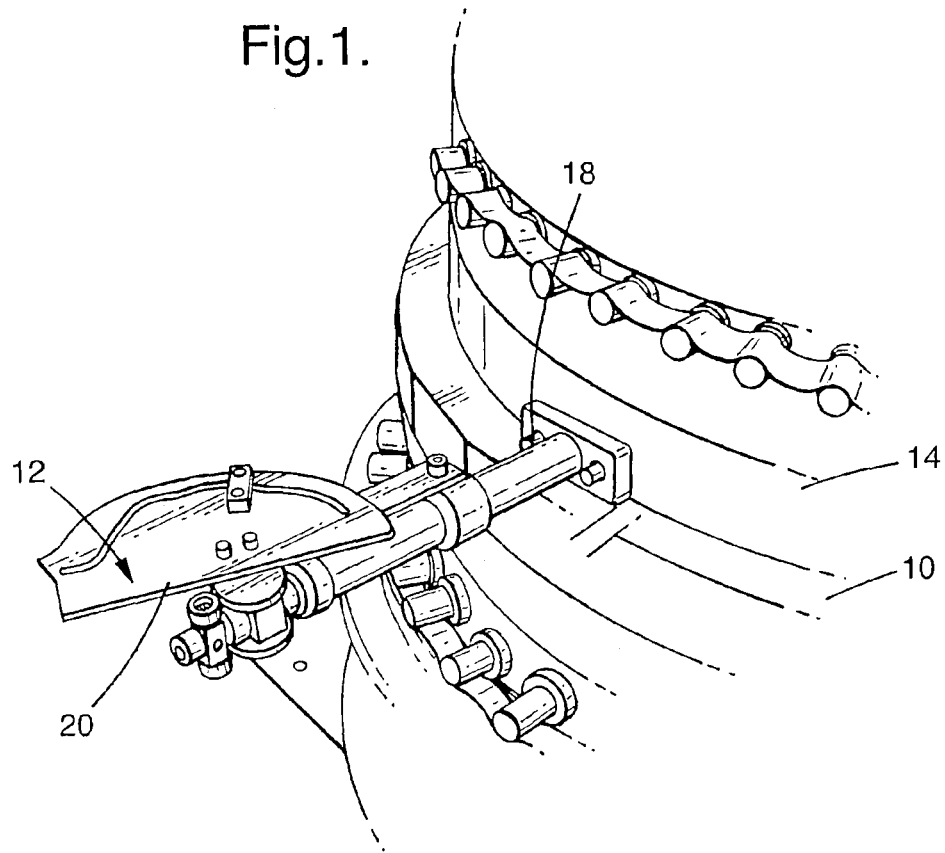
FIG. 1 is a side view of part of a jet engine housing 10 having an inspection tool 12 in accordance with a first embodiment attached thereto.
Figure 2:
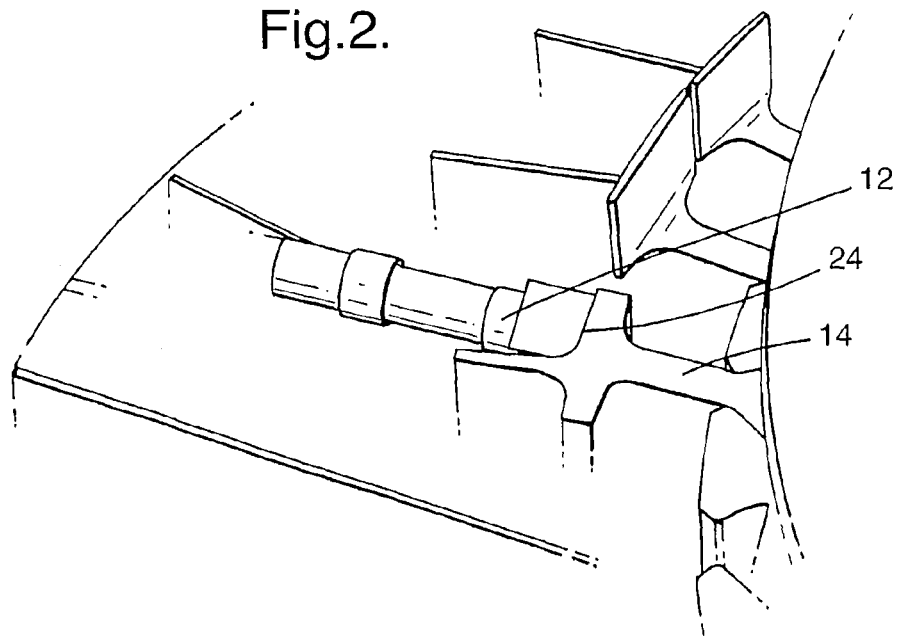
FIG. 2 is a detailed view showing the inspection tool 12 in an inspection position in relation to a turbine blade 14.

As shown in FIGS. 1 and 2, the tool 12 is securely attached to the engine housing 10 by bolts 18. A primary cam 20 is rotated to cause a distal part of the tool to advance with the housing to arrive, eventually, at the position shown in FIG. 2. The primary cam 20 acts on a secondary cam 22 during advancement of the tool, to control the angle of the end of the tool. In this way the tool can be manoeuvred through a tortuous space, without touching any of the parts within the housing, to bring an ultrasonic sensor 24 into the crutch of a turbine blade 14. Wires (not shown) connect and power the sensor. Any cracks due to fatigue at the forward end of the turbine blade are picked up by the sensor and transmitted to a control panel (not shown).

The sensor and the distal end of the instrument can then be withdrawn by reversing the rotational axis of the primary cam 20. The engine is then indexed round to present the next blade 14 and the operation repeated. In this way all turbine blades can be quickly and easily inspected for signs of fatigue with the control panel being able to identify any blades in need of replacement.

Figure 5:
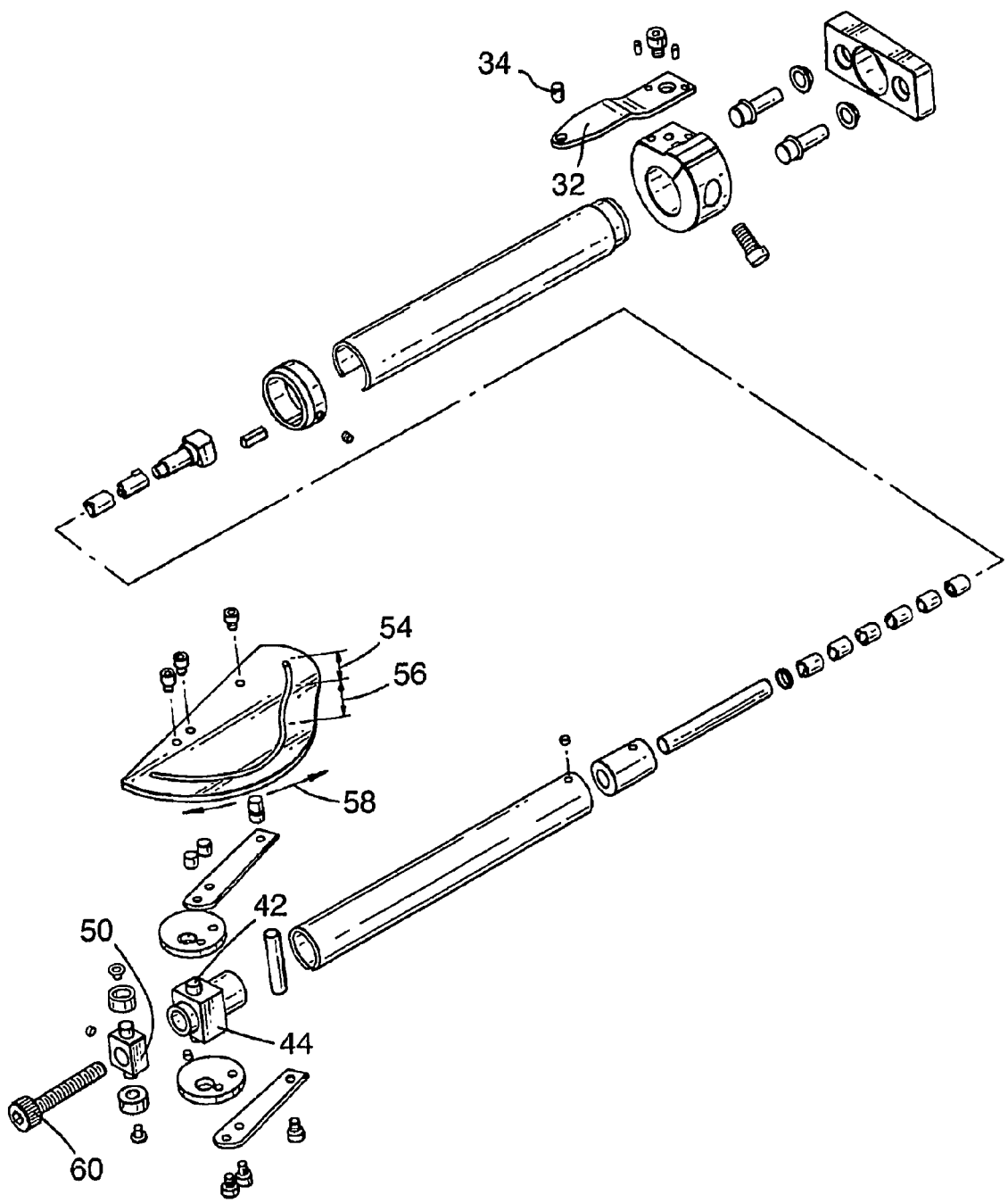
FIG. 5 is an exploded view of the parts that make up the tool 12.
Figure 6A:
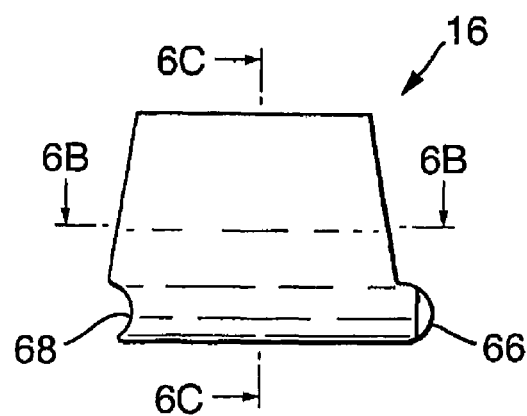
FIG. 6A is a plan view of a segment 16 that may be used with any of the tools.
Figure 6B:
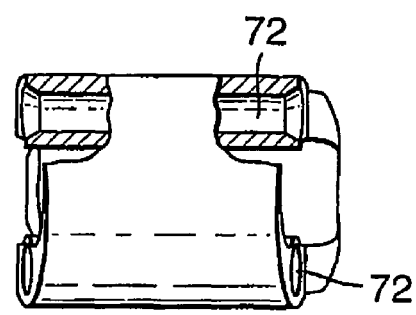
FIG. 6B is a section through 6B of FIG. 6A.
Figure 6C:
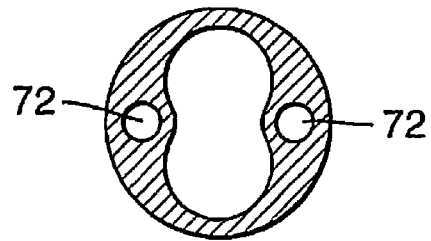
FIG. 6C is a section through 6C of FIG. 6A.
Figure 6D:
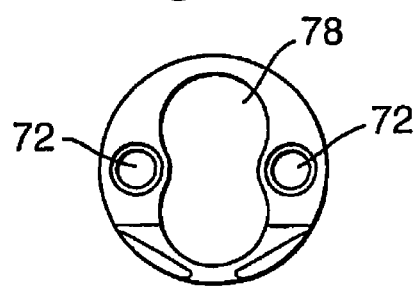
FIG. 6D is an end view of FIG. 6A.
Figure 8:
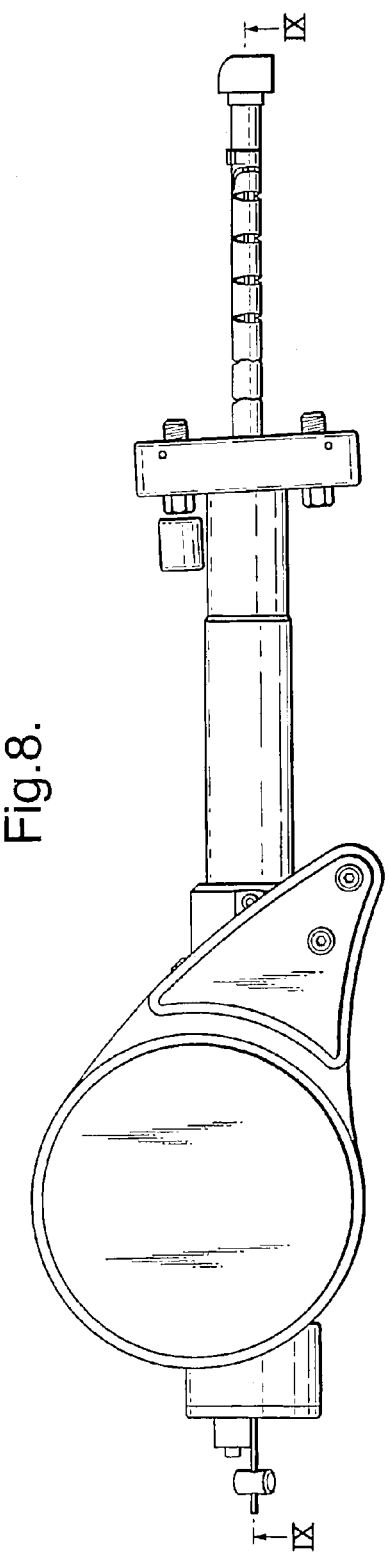
FIG. 8 is a plan view of the tool 112.
Figure 9:
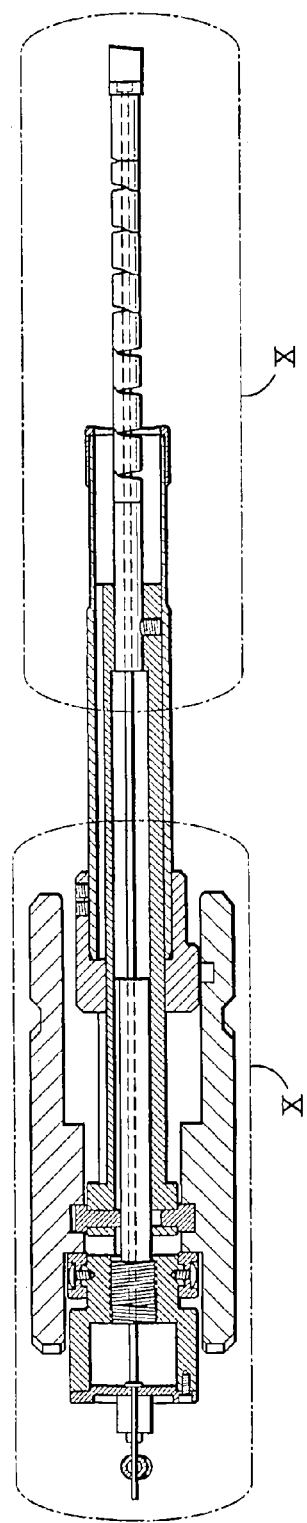
FIG. 9 is a section along the line IX-IX of FIG. 8.

Reference is now made to FIGS. 3 to 5. The tool 12 includes an engine mounting tube 26 with a flange 28 connected to the distal end. The flange is brought up against the engine housing 10 and the bolts 18 are secured into threaded openings in the housing.

A collar 30 surrounds the tube mid way along the tube and is fast with the tube. A pivot mounting plate 32 is secured to the collar and extends towards the proximal end of the tube. A pin 34 extends through the end of the plate 32 into a slot 36 of the primary cam 20.

The primary cam 20 is fast with cam plates 32A and 38 by means of the bolt 40. Two of the bolts 40 are also secured to a plate comprising the rotatable second cam 22. The second cam is pivotally mounted on a pin 42 that projects from a hollow block 44. As can be seen in the drawings, there are two plates that comprise the secondary cam 22 one on each side of the block 44. The second cam is also fixed to the primary cam by means of a plate 32A that is connected to the plate 38 by a tube 46.

The block 44 is fast with a hollow shaft 48 that is able to move towards or away from the distal end of the instrument through the mounting tube 26. A tension controlling member 50 is able to move with the shaft 48 and is also able to move towards and away from the tube by a restricted amount determined by the second cam 22, as described below. It is the relative movement of the second cam that is able to tension or relax wire or wires in the tool to determine the angle of the segments relative to each other and to cause locking of the segments in a limit position.

In the position shown in FIGS. 3 and 4, the instrument is shown in the retracted position. Movement of the primary cam to cause the slot 36 to move past the fixed pin 34 causes the primary cam to move towards the housing and also to swing out in the direction shown by arrow 52. This movement results in the insert of the tool into the housing. It can be seen that, for a constant rate of turn of the cam 20, the rate of insertion will vary as the slot is not an arc around the pin. The slot will cause a medium rate of insertion around the initial curve 54, then faster in the rate of insertion around the section 56 before the final relatively slow rate of insertion around section 58.

As the primary cam 20 moves about the pin 34 so too does the secondary cam 22 as the plates 38 and 32A are fast with that cam 22. The secondary cam 22 will rotate about its eccentric shaft to cause the periphery of the cam 22 to bear against rotatable cam followers 60 pivotally mounted on the controlling member 50. Movement of the tension controlling member 50, relative to the shafts 48 pulls or increases the tension of wires on the segments thus causing curvature of the distal end of the instrument within the engine housing.

It will be appreciated that the primary cam 20 and secondary cam 22 may each be electronically or manually controlled.

It can be seen that the rate of insertion of the instrument need not be directly proportional to the increase in tension (or reduction in effective length) of the wires. Thus the instrument can be advanced with little or no change in curvature of the distal end or can be caused to curve at a possibly relatively significant rate with little or no advancement of the instrument. The instrument may be provided with a pretension, possibly by the cam having acted or possibly by an inbuilt pretension such that, as the first segment and possibly subsequent segments enter the housing they automatically adjust their position relative to each other when free from any constraint provided by the housing.

Furthermore, a predetermined profile of rate of advancement and rate of curvature is provided by the cooperating primary and secondary cams. In addition, the profile of either or both of these cams can be altered to achieve different relative rates during part or a complete cycle.

The instrument is withdrawn by reversing the direction of movement of the primary cam and thereby reversing the secondary cam.

The movement of the segments 16 will now be described with reference to FIGS. 5, 6A, 6B, 6C, 6D and 7. As shown in FIG. 5, a threaded member 60 is connected to and fast with the control member 50. Two wires 62 (shown in FIG. 13) are connected to the control member 50 and extend down one side of the shaft 48, through one side of the segments and around the end segment before returning to and being connected to the control member 50.

In the untensioned condition of the wire, the resilience in the wire may maintain the segments in a generally straight direction under the natural weight of the segments. Alternatively or additionally, the instrument may include a relatively rigid wire 64 that extends through the segments and maintains the segments in a straight direction or other desired configuration such as curved until sufficient tension is exerted on the wires to cause flexure beyond that maintained position.

The segment shown in FIG. 6 is the desired segment. However other segments may be used. The segment comprises a lower section that includes, in one direction of the elongate extent of the instrument, a leading bead 66 and a trailing socket 68. The segment tapers at each end in an upwardly and inwards direction. In the untensioned state of two adjacent segments there is contact at adjacent beads 66 and sockets 68 but the segments are otherwise spaced from each other to form a diverging gap 70 between the segments, as seen in FIG. 4.

The wire 62 passes through openings 72 in the middle of each segment and to either side. Tension on the wire causes the gap to be closed with adjacent segments ultimately abutting each other around their complete periphery. Consequently the majority of the facing sides of segments comprises a flat plane. However, the beads 66 and sockets 68 are rounded such that pivoting movement is about the bead and socket of adjacent segments and such that the segments are constrained to stay together in both the position where the gap is open or closed or in between. In this respect any relative up or down movement, as seen in particular at the bottom left hand side of FIG. 6A, would also require movement of the segments away from each other in order to separate the beads and sockets.

Whilst the segment has been described as "top" and "bottom", it will be appreciated that adjacent segments could be at any orientation to each other.

In FIGS. 7 to 23 like parts to those of the previous figures have been given the same number prefixed by the numeral 1 or 2, 3, 4, 5, 6 or 7 as appropriate. Only significant differences from the previous embodiment will be described. Otherwise the instruments operate in the same way.

Figure 13:
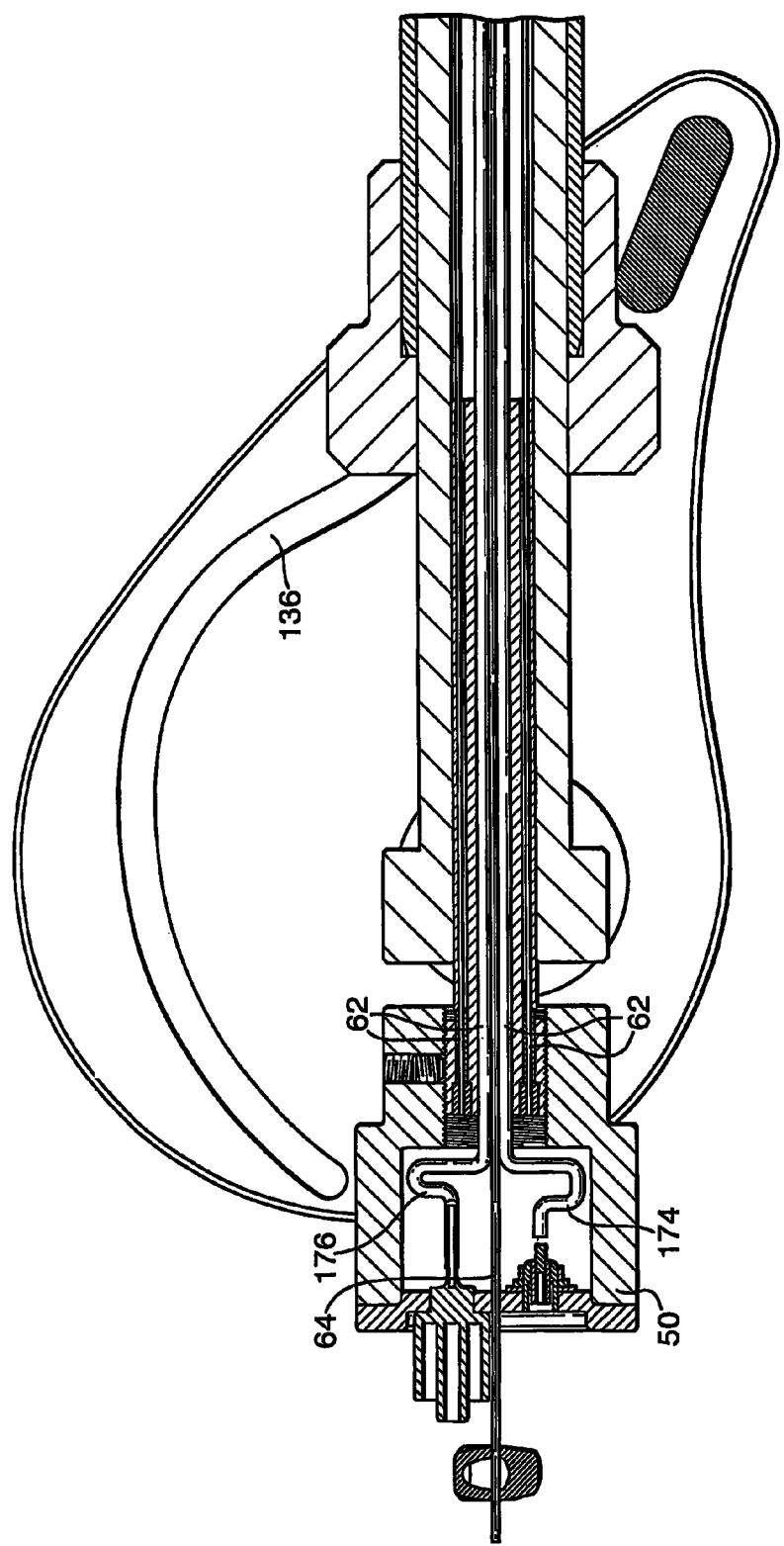
FIGS. 13 and 14 are details of the areas XIII and XIV respectively of FIG. 12.

The primary cam of the embodiment of claims 7 to 14 comprises two plates 120 which are connected together by two bolts 140 passing through a connecting block 146. A pin 134 fast with the tube 126 resides in a shaped groove 136 as seen in FIG. 13. The plates are also connected to the shaft 148 by a pair of bolts 140 such that the plates can pivot about the axis of the bolts.

The tensioning control members 150 include rollers 160 that are biased towards the secondary cam 122. In this instance the secondary cam 122 is integral with the primary cam.

As the primary cam is pushed towards the distal end and turned the primary cam cause the shaft to enter the housing. The secondary cam 122 rotates about the eccentric mounting provided by the bolts 140 to urge the tension control member away from the shaft 148 thereby causing the extent of the distal end to deviate.

The tension control member 150 is provided with power input leads 174, for the remote ultrasonic sensor 24, and output leads 176, to pass the detected information back to the control. These leads, in the position shown in FIG. 13, are given some slack in the member 150 to allow for the tensioning movement of the secondary cam. The leads extend to the sensor through the central opening 178 seen in FIG. 6D.

Figure 11:
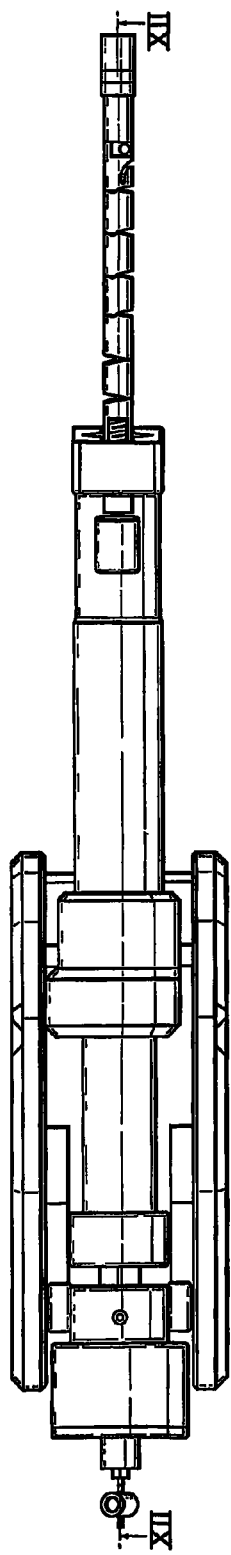
FIG. 11 is a side view of the tool 112 and FIG. 12 is a section on the line XII-XII of FIG. 11.
Figure 12:
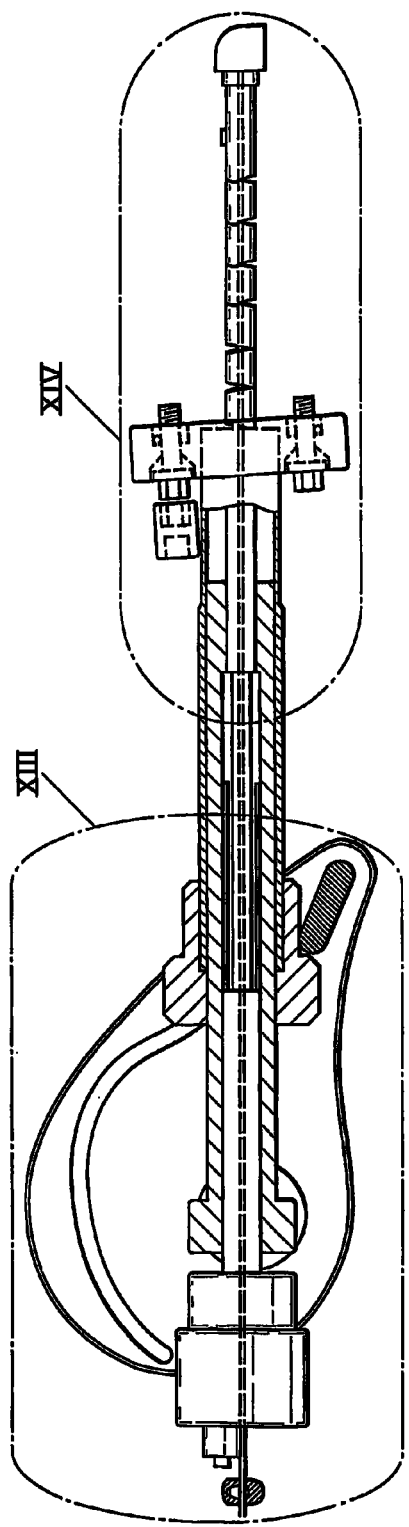

With the segments shown in FIG. 11 it can be seen that not all segments are identical. The segments 16 are as described in relation to FIG. 6. However, the segment 178 that is interposed between two segments has the end extending from the groove diverging outwardly rather than inwardly. This causes the segment to the right to have the groove and bead at a lower region with the segment to the left having the bead and groove on top. Consequently, on tensioning the section to the right of the segment 178 curves upwardly with that to the left curving downwardly.

It can be seen in all embodiments that only the portion of the segments that extend beyond the tube 26, 126 is able to curve through tensioning. Thus in FIG. 11 initial curvature will be upwardly until the segment 178 is clear of the tube 126, whereupon the curvature may be downwardly.

Figure 14:
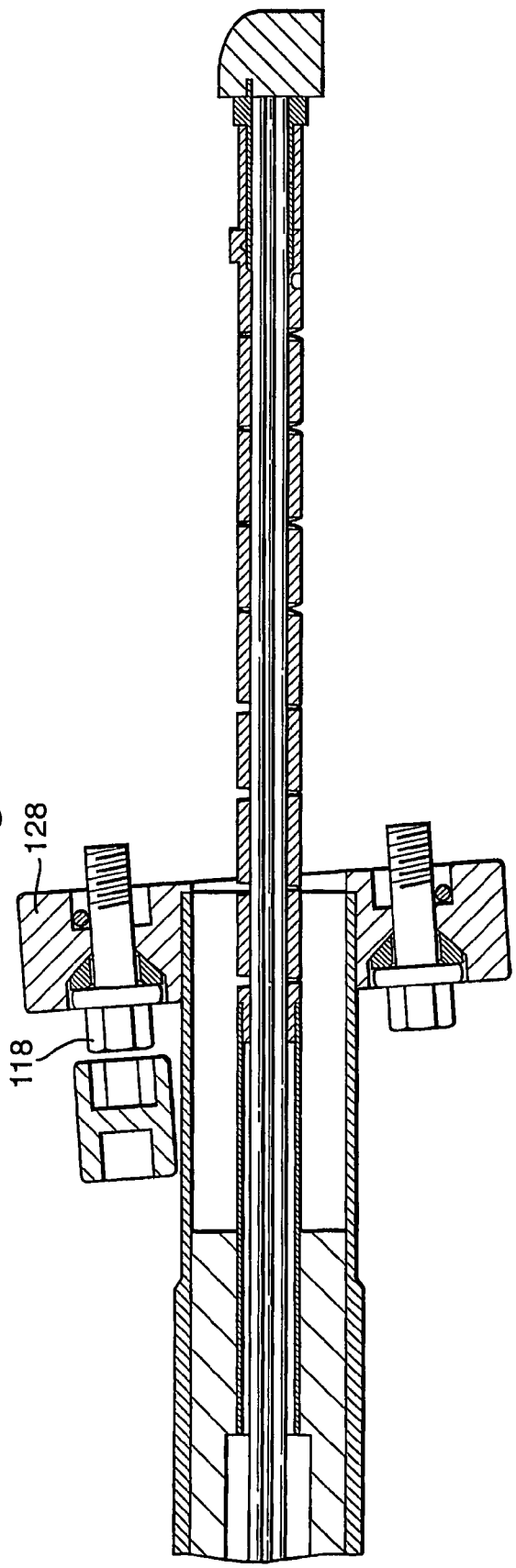

A further feature of the second embodiment is shown in FIG. 14 in which the flange 128 is mounted on the housing such that the elongate extent of the instrument is at an angle other than 90° to the housing. In this way the instrument may head in to the housing at an angled extent upon initial insertion, even without tensioning.

In this or any of the other embodiments the segments may be such that angle changes, such as that provided by segments 178, are able to be provided. For instance there may be more than one segment 178 or a different segment 178 may be provided with the groove and bead being other than parallel such that the segment can effect an angle change between segments on each side of 45° or 30° or 60° or any desired angle change. Thus the distal end of the instrument may extend in these directions when tension is applied by, for instance, extending first to the right, then upwardly, then to the left, and then downwardly, before extending to the left at the distal end.

Figure 15:
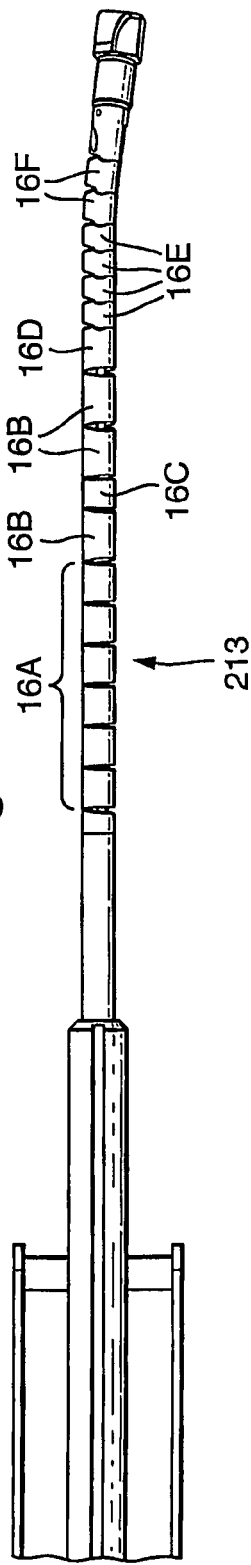
FIG. 15 is a side view of a third embodiment of a tool 212 in a released position.

An example of a different configuration that can be formed by the distal end of an instrument is shown in FIG. 15 in which the first six segments 16A each taper downwardly to enable angle changes between adjacent segments to go through 5°. Then there are three segments 16B that each taper downwardly to allow angle change through 10°. In between the segment 16B there is a segment 16C with no tapering. Then there is a changeover element 16D followed by four segments 16E that taper upwardly by 10°. Finally there are two segments 16F that also taper through 10°. These segments 16F may taper upwardly and to one side or may have a released position in which they cause a bend in the elongate extent when not tensioned.

Figure 16:
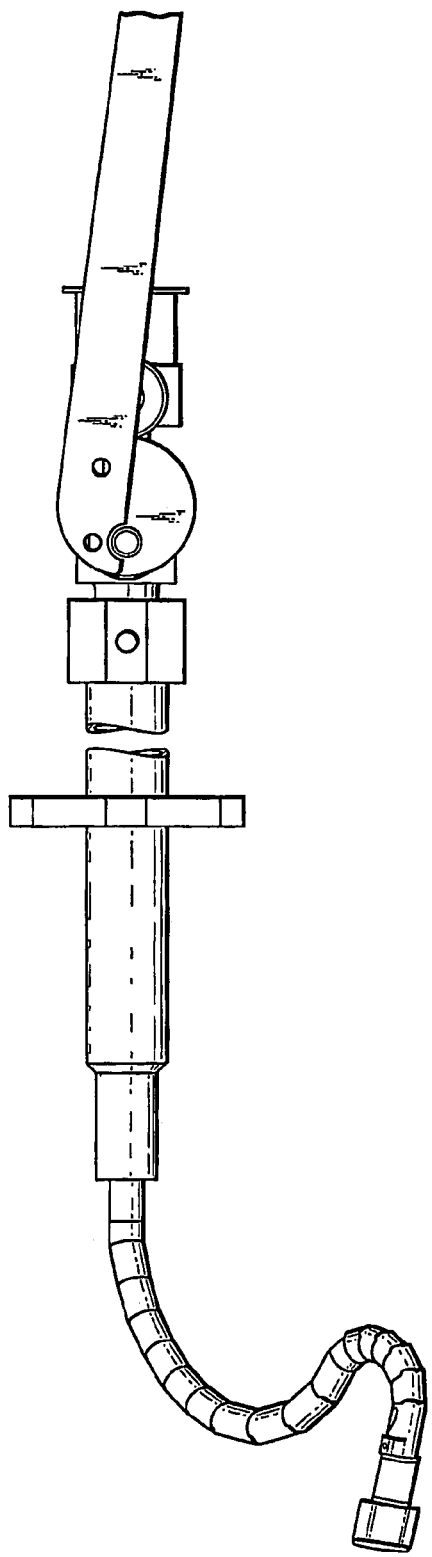
FIGS. 16 and 17 are plan and side views of the tool 212.
Figure 17:
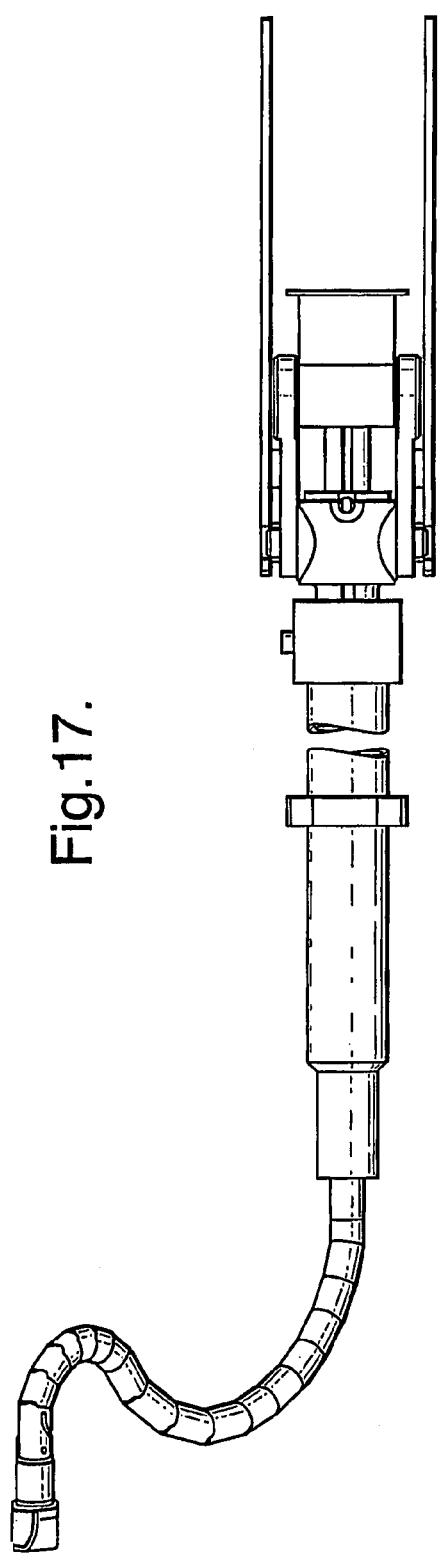

FIGS. 16 and 17 show the tensioned formation that the instrument shown in FIGS. 1 and 2 is required to take in order for, the sensor to reach the required site.

FIG. 18 shows the distal end of an instrument including a short segment 316A that, under tension and when constrained cause an upwards bend and short segment 316B that cause a downwards bending. In between those segments an elongate segment 316C that also causes a change of its direction. A slidable tube 376 extends over the segments. The tube can extend partially or completely over the segments 316B or 316A during initial insertion of the instrument. In this way flexing of the shrouded segments can be prevented or restricted under tension. Then, when required, the tube can be moved, for instance to extend over the straight segment 316C, to allow the non exposed segments to turn or turn more. Movement of the tube 376 may be effected by a first wire extending through the openings 78 of the segments and then up through an opening at a distal segment beyond where the sleeve is required to be with that end then being connected to the distal end of the tube 376. A trailing end of the tube may be connected to a second wire beyond where the tube is required in use to be. That second wire may likewise pass through the openings 78 and up through a segment. Consequently by pulling on the appropriate wire the tube can be slid to and fro along the instrument. Indeed it may be that a first part of the segment that has been flexed is subsequently required to be straightened, in order to reach around a tortuous path. The tube may be slid to at least partially straighten the previously curved section. That straightening may cause other segments to curve either by being newly exposed from the tube or by the tension caused by straightening the sections being transferred to other segments.

Alternatively, the tube 376 could be slid by an hydraulic piston with fluid being supplied through hoses in the opening 78. The section 316C may comprise the static centre portion of a cylinder and piston with fluid being applied to a distal or proximal end of the sleeve to cause movement in the required direction.

Any of the embodiments referred to herein may be provided with means for enabling relative movement of two adjacent segments and then causing at least a partial reversal of that relative movement and alternatively or additionally then causing relative movement of a further pair of adjacent segments. Such movement may be arranged to occur during insertion of the tool or when the tool is stationary (that is, no longer being inserted) or when the tool is being retracted. These modes may be effected with the use of the tube 376.

FIGS. 19 and 20 show a further embodiment of the instrument 412.

In this embodiment outer segments 416A are provided on the end of a shaft 448A. Inner segments 416B extend through the outer segments and beyond the distal end of the outer segments. The inner segments are mounted on the end of the shaft 448B. The control of the inner segments in relation to the curves that extend through the shaft 448B and the openings 72 in the segments is as previously described. The wires for the segments 416A may extend between the shafts 448A and B and either between the segments 416A and B during their co extent to the distal segment 418A or through openings (not shown) in the segments 416A. The wires may terminate at the distal segment. The shafts 448A and 448B are slidable relative to each other.

Prior to insertion, the shaft 448B will be retracted such that the segments 416B are all coextensive with the segments 416A or the shaft 448A with the sensor 424 just protruding from the distal outer segment 416A.

The segments 416A and 416B also extend initially in a straight line.

Then the shafts 448A and B are advanced together with the segments 416A being caused to turn relative to each other before being locked by tension in the wires locking the abutting segments in the position shown. Then the shaft 448B is advanced, without the shaft 448A advancing, to cause the sensor 424 to be advanced and bent around the distal segments 416B until the position shown is arrived at with all segments now locked.

The primary and secondary cam for the instrument 412 are not shown. However, there could be a first primary and secondary cam for the outer segments and, when movement is taking place of these cams a second primary and secondary cam may be carried with the first cam without the second cams operating. Then the second cams may operate without the first cams operating. In such an arrangement there would need to be some slack provided in the wire of the sections 416B to enable the segments to undergo the initial turn with the outer segments as the outer segments are turned, both during initial insertion of the instrument and during subsequent final retraction. Alternatively a single mechanism may be provided to enable the steps of outer and inner shaft advancement with distal segments turning and then inner segments turning.

FIG. 21 shows a curved shaft 548 for use with the embodiments previously referred to. Such a curved shaft can reduce the distance between the point of entry in a housing and the location where the sensor is to be located.

FIG. 22 shows a different configuration that the instrument 612 can take with the segments being able to be bent around (and retracted from) a sine wave shape, possibly without contacting the members 680.

FIG. 23 shows the shapes that further instruments may take with one instrument passing through two wave lengths of a sine wave.

Whilst the instruments have been described with a single wire or a pair of wires passing through the segments to cause the segments to turn it will be appreciated that at least two segments could be controlled by separate wires. In this way pulling of one wire would cause turning of one segment relative to another and pulling of the other wire would cause turning of other segments. In this way, during insertion or retraction the timing of the turning of at least two different segments can be precisely controlled with a first pair or group of segment turning first and then a second pair or group of segments turning, possibly with the turning motion coinciding or possibly after completion of the turning of the first pair or group of segments. Furthermore, the first pair or group of segments could start to turn back either during or after the second pair or group of segments have started to turn. It will also be appreciated that all segments may be able to turn and may have their separate control.

The separate wires for different segments may be controlled by different second cams which may each be caused to turn by a common primary cam with at least two secondary cams having different profiles to cause turning at different times. Alternatively solenoids or motors may be connected to the different wires with those solenoids being activated at an appropriate time to cause turning of the segments. With solenoid or motor actuation, turning of the segments in one or both directions can be effected in one rapid movement or in steps or turning may commence, then stop and then commence again in the same direction possibly in a succession of steps or in a succession of gradual movements. The shaft may be advanced when the segments are moving for all of the times or part of the time or none of the time.

The shaft may also be caused to move by motor or solenoids or any other convenient manner.

Whilst the segments have been shown as locking together at an extreme degree of relative movement it will be appreciated that this need not necessarily occur or may occur through extreme tension in the wires without abutment. Furthermore, the segments have been shown as moving in one direction only. It is possible that segments that turn in a first and then a second, opposed direction could be used in any of the embodiments or methods or sequences of operation described. For instance, segments could be used that had a pivot spaced from the sides such as in a mid region. In this way the segments could extend in a straight line and then be turned one way or the other relative to each other, possibly sequentially as the instrument is being inserted with wires pulling the segment first one way about the pivot and then another way.

Whilst the segments have been shown as separate pieces at least two of the segments may be integral with each other such as by a plastic hollow tube or alternatively or additionally an elastic tube having appropriate parts removed, for instance, to create notches in the tube. The notches may leave a side pivot or a pivot spaced from the sides such as in the middle.

Whilst the embodiment has been described with the tool being used in only one configuration it will be appreciated that the tool could be used in a plurality of second configurations such as by taking readings as the tool advances or turns or after the tool has advanced and stopped or rotated and stopped or both or, alternatively or additionally by rotating the elongate member about its elongate axis. In this way, 15 readings of stress may be taken at 15 different locations of each turbine blade.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An instrument comprising:
    an elongate portion having a proximal and a distal region and a plurality of segments between the proximal and distal regions, the segments being configured to be movable relative to each other:
    a primary cam having a slot;
    a follower,
    a tensioner; and
    a wire connected between the tensioner and one of the plurality of segments:
    the distal region comprising a tool, wherein
        in use, the primary cam is configured to both advance and curve the elongate portion at the distal region thereof, according to movement of the follower along the slot,
        movement of the primary cam causing the tensioner to change the tension in the wire so that the angle of the one or more of the plurality of segments relative to each other is changed, the elongate portion moving from a first configuration to at least one second configuration whereby the elongate portion is caused to curve, and
        the slot having a non-uniform curvature.

2. An instrument as claimed in claim 1, wherein movement from the first to the second configuration is arranged, in use, to occur as the tool is advanced during in at least part of the advancement.

3. An instrument as claimed in claim 1, wherein movement from the first to the second configuration is arranged, in use, to occur automatically during advancement.

4. An instrument as claimed in claim 1, further comprising a secondary cam arranged to move the elongate portion from the first to the second configuration.

5. An instrument as claimed in claim 4, wherein the primary cam is arranged to move to cause sliding movement of part of the elongate portion with the movement of the primary cam causing movement of the secondary cam.

6. An instrument as claimed in claim 4, wherein the secondary cam comprises a cam having a predetermined profile.

7. An instrument as claimed in claim 6, wherein movement of the primary cam is arranged to cause movement of the cam.

8. An instrument as claimed in claim 4, wherein at least one of the primary and secondary cams is arranged to move at least partly in the same direction as the elongate portion, as the elongate portion, in use, advances.

9. An instrument as claimed in claim 8, wherein both the primary and secondary cams move at least partly in the same direction as the elongate portion, as the elongate portion, in use, advances.

10. An instrument as claimed in claim 4, wherein separate wires control at least two separate curves for at least two spaced locations of the elongate portion.

11. An instrument as claimed in claim 10, wherein one of the separate wires is arranged, in use, to initiate a curve at one location prior to another of the separate wires initiating a curve at another location.

12. An instrument as claimed in claim 4, wherein the rate of at least one of the primary and secondary cams is varied.

13. An instrument as claimed in claim 4, wherein the primary cam is arranged to cooperate with the secondary cam to cause the relative timing of the advancement of the distal region of the elongate portion and the movement of the elongate portion from the first to the second configuration to be predetermined during at least part of the advancement.

14. An instrument as claimed in claim 1, wherein movement of the elongate portion from the first to the second configuration is arranged to occur during all of a period of advancement of the instrument.

15. An instrument as claimed in claim 1, wherein the rate of advancement of the elongate portion is arranged to vary relative to the rate of change of curve of the elongate portion.

16. An instrument as claimed in claim 1, wherein the slot has a predetermined profile selected to vary the rate of advancement of the distal region as the follower moves along the slot.

17. An instrument as claimed in claim 1, wherein the follower comprises a stationary part of the instrument.

18. An instrument as claimed in claim 1, wherein in the second configuration, the elongate portion is held firmly in that configuration.

19. An instrument as claimed in claim 1, wherein in the second configuration, curving beyond that effected to arrive at the second configuration is restricted by abutment of portions of the elongate portion.

20. An instrument as claimed in claim 1, wherein the instrument is arranged to curve at different elongate extents of the elongate portion when moving from the first to the second configuration.

21. An instrument as claimed in claim 20, wherein the elongate portion is arranged to curve in different directions at different locations which different directions are other than opposed to each other.

22. An instrument as claimed in claim 20, wherein the elongate portion is arranged to curve at one location before curving at another location.

23. An instrument as claimed in claim 20, wherein the instrument is arranged to first curve at one location before at least partially curving in an opposite direction of the first curving at a location when moving from the first to the second configuration.

24. An instrument as claimed in claim 23, wherein the elongate portion is arranged to recommence the first curving after the partially curving in the opposite direction when moving from the first to the second configuration.

25. An instrument as claimed in claim 1, wherein the instrument is arranged to curve in directions opposed to each other.

26. An instrument as claimed in claim 1, wherein the instrument is arranged to at least partially straighten when moving from the first to the second configuration.

27. An instrument as claimed in claim 1, further comprising a control member that is slidable relative to the elongate portion such that the control member can change a direction of a curved portion of the elongate portion to at least partially reduce the curve.

28. An instrument as claimed in claim 27, wherein the control member at least partially surrounds the elongate portion over at least part of the extent of the elongate portion.

29. An instrument as claimed in claim 27, wherein the control member is hydraulically moveable along the elongate portion.

30. An instrument as claimed in claim 1, wherein the proximal region of the elongate portion comprises a rigid portion.

31. An instrument as claimed in claim 30, wherein the rigid portion is a straight portion.

32. An instrument as claimed in claim 30, wherein the rigid portion is a curved portion.

33. An instrument as claimed in claim 1, further comprising a hollow member through which at least part of the elongate portion is arranged to be moved during advancement.

34. An instrument as claimed in claim 33, wherein prior to advancement, substantially all of the elongate portion is located rearwards of the distal end of the hollow member.

35. An instrument as claimed in claim 1, further comprising at least two sections along the elongate portion that can pivot relative to each other to cause movement from the first to the second configuration.

36. An instrument as claimed in claim 35, wherein at least two of the sections are integral.

37. An instrument as claimed in claim 35, wherein at least two of the sections are separate from each other but pivotally connected.

38. An instrument as claimed in claim 35, wherein at least one pivot is located at the side region of the elongate portion.

39. An instrument as claimed in claim 35, wherein at least one pivot extends across the elongate portion such that the part of the pivot axis across the elongate portion is spaced from the sides of the elongate portion.

40. An instrument as claimed in claim 35, further comprising at least two sections that are pivotally moveable relative to each other and that are selectively moveable from the first configuration to different selected second configurations by pivoting in a first direction about the axis or a second, opposite direction about the pivotal axis.

41. An instrument as claimed in claim 35, further comprising at least one flexible member arranged to effect movement from the first to the second configuration which flexible member is connected to at least one of the sections.

42. An instrument as claimed in claim 1, wherein the elongate portion is hollow along at least of its extent.

43. An instrument as claimed in claim 42, further comprising a power device or a control device or a monitoring device arranged to extend through the hollow elongate portion.

44. An instrument as claimed in claim 1, further comprising a flange arranged to attach the instrument to an exterior housing of a machine whilst the advancement and curving of the elongate portion is occurring.

45. An instrument as claimed in claim 1, wherein when attached to an exterior housing of the machine, the elongate portion, in use, is arranged to be extended into the interior of the machine housing.

46. An instrument as claimed in claim 1, further comprising a plurality of different second configurations.

47. An instrument as claimed in claim 46, wherein the plurality of different second configurations includes different curving configurations of the elongate portion.

48. An instrument as claimed in claim 46, wherein the plurality of different second configurations comprises different extents of advancement of the distal region.

49. An instrument as claimed in claim 1, the slot having a non-uniform curvature comprising a plurality of curved sections, wherein each of the plurality of curved sections has different lengths.

50. An instrument as claimed in claim 1, the slot having a non-uniform curvature comprising a plurality of curved sections, wherein each of the plurality of curved sections has different lengths and radius of curvature.

51. An instrument as claimed in claim 1, the slot having a non-uniform curvature comprising a plurality of curved sections, wherein each of the plurality of curved sections has different lengths and heights of curvature.

* * * * *